United States Patent [19]
Parham et al.

[11] Patent Number: 5,552,671
[45] Date of Patent: Sep. 3, 1996

[54] UV RADIATION-ABSORBING COATINGS AND THEIR USE IN LAMPS

[75] Inventors: Thomas G. Parham, Gates Mils, Ohio; Robert L. Bateman, Southern Shores, N.C.; Gary R. Allen, Chesterland; John M. Davenport, Lyndhurst, both of Ohio

[73] Assignee: General Electric Company, Schenectady, N.Y.

[21] Appl. No.: 388,542

[22] Filed: Feb. 14, 1995

[51] Int. Cl.⁶ .............................. H01J 61/40; H01J 5/16
[52] U.S. Cl. ..................... 313/635; 313/112; 359/359; 359/389
[58] Field of Search ..................... 313/110, 112, 313/113, 635; 359/359, 389

[56] References Cited

U.S. PATENT DOCUMENTS

| | | | |
|---|---|---|---|
| 3,410,625 | 11/1968 | Edwards | 359/589 |
| 4,949,005 | 8/1990 | Parham et al. | 313/112 |
| 5,059,865 | 10/1991 | Bergman et al. | 313/112 |
| 5,214,345 | 5/1993 | Saito et al. | 313/635 |
| 5,336,969 | 8/1994 | Weiss et al. | 313/112 |

Primary Examiner—Nimeshkumar D. Patel
Attorney, Agent, or Firm—Stanley C. Corwin; George E. Hawranko

[57] ABSTRACT

The subject invention, therefore, relates to a multi-layer coating for use on a thick-walled metal halide lamp which emits visible light radiation and absorbs and reflects UV radiation, and which further manages the thermal non-uniformity problems across the thickness of the arc tube to substantially eliminate devitrification problems.

28 Claims, 7 Drawing Sheets

— Doped Quartz    --Thin Film

— Doped Quartz    -- Thin Film

— Doped Quartz  -- Thin Film

UV RADIATION-ABSORBING COATINGS AND THEIR USE IN LAMPS

BACKGROUND OF THE INVENTION

Metal halide lamps emit radiation at wavelengths above 200 nm. That portion of the emitted radiation falling between 150–400 nm is ultraviolet (UV) radiation, which is harmful to human eyes and skin and which also causes fading, discoloration and degradation of fabrics, plastics and paints. In addition to the harmful results of UV radiation which escapes a lamp, the UV radiation also causes problems within the lamp itself. A need exists, therefore, for a means for blocking, and preferably for eliminating, the emission of UV radiation.

Conventional arc tubes may employ a glass outer jacket to prevent the external emission of UV radiation. Traditional metal halide lamps did not encounter the problems of today's progressive products because the arc tube was generally pure quartz enclosed in a glass outer jacket to provide UV protection. Newer products, however, such as fiber optic sources and automotive lamps, encounter size and use constraints which prohibit the use of outer jackets. Doped quartz has therefore been used in thin-walled arc tubes to absorb the UV emissions from the arc within the arc tube itself, thus eliminating the need for a glass outer jacket.

The use of doped quartz, as set forth in U.S. Pat. No. 5,196,759, is suitable for conventional thin-walled lamps. It is not suitable, however, for use with thick-walled arc tubes, where the combination of hot spot devitificaton with doped quartz, causes enhanced devitrification and shortened lamp life. In thick-walled arc tubes, the UV radiation from the arc causes thermal non-uniformity across the arc tube wall. Naturally occurring "hot spots" within the arc tube wall, which are located directly above the discharge in metal halide arc tubes, are due to natural convection within the tube. These hot spots weaken the arc tube wall causing accelerated devitrification and eventual failure of the lamp. This problem, inherent in all metal halide lamps, is compounded when doped quartz is used in thick-walled arc tubes, because emitted UV radiation is absorbed preferentially along the inside wall of the arc tube due to the doping. This heat energy, in combination with the already present hot spot, causes accelerated devitrification and lamp failure.

A further option for UV protection is the use of coatings on the outer surface of the arc tube. One such option is set forth in U.S. Pat. No. 5,336,969, which described the use of a coating comprising a suspension of $CeF_3$ and $Al_2O_3 \cdot SiO_2$ which is applied to the arc tube surface and fired. This coating operates to absorb UV transmission. Another option is set forth in U.S. Pat. No. 4,949,005 which discloses a tantala-silica interference filter used on a tungsten halogen lamp to reflect or absorb specific wavelengths by variation in filter design.

While various types of coatings which merely absorb UV radiation are known in the lamp industry, these coatings do not address the inherent devitrification problems present in thick-walled metal halide arc tubes. Therefore, a need exists for a coating for application to thick-walled arc tubes which will absorb UV radiation to prevent external emission and eliminate accelerated devitrification due to the thermal energy deposited on the arc tube wall.

To this end, the subject multi-layer coating composition, suitable for use on thick-walled metal halide lamps, solves all of the foregoing problems. It eliminates external UV radiation. Internally, that is within the lamp envelope, the subject coating functions to enhance vaporization of the metal halide components of the arc tube and decrease devitrification, i.e. lamp life is prolonged. The coating also functions to relieve the arc tube of the compounded effects of hot spots in combination with UV energy, which affect the mechanical strength of the arc tube.

SUMMARY OF THE INVENTION

The subject invention, therefore, relates to a multi-layer coating for use on a thick-walled metal halide lamp which transmits visible light radiation and absorbs and reflects UV radiation, and which further manages the thermal non-uniformity problems across the thickness of the arc tube to substantially eliminate devitrification problems.

DETAILED DESCRIPTION OF THE INVENTION

Figure 1:
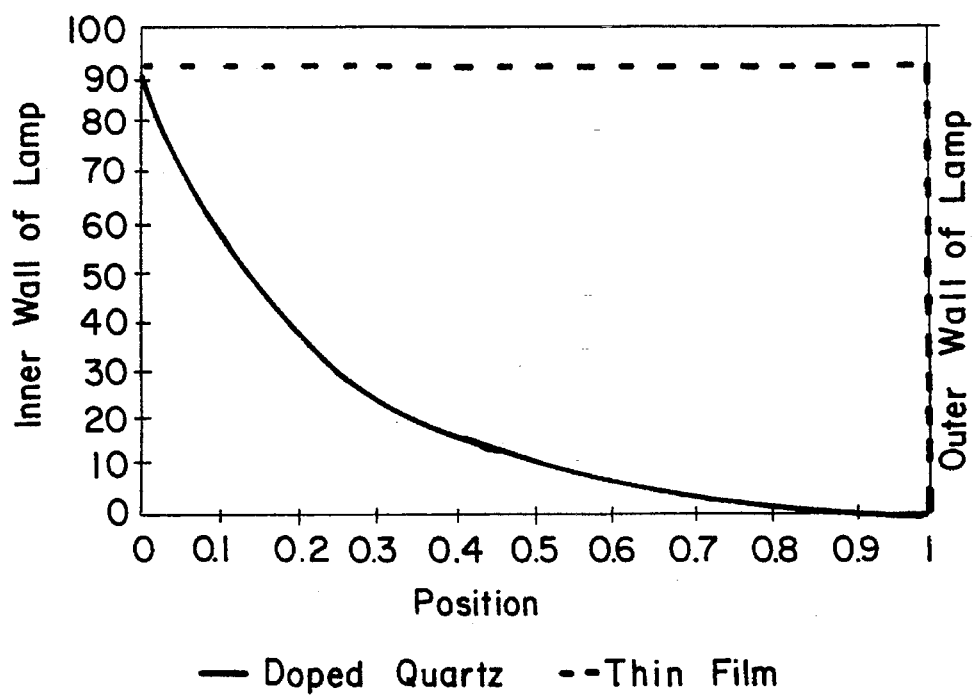
FIG. 1 is a graph showing the UV transmittance of a doped quartz arc tube as compared to a pure quartz arc tube bearing the subject thin film coating.

The subject invention relates to a coating composition intended for use on metal halide lamp surfaces to absorb UV radiation and to control thermal non-uniformity across the arc tube. Specifically, the invention contemplates the deposition of a UV absorbing coating on the exterior surface of the arc tube of a thick-walled metal-halide lamp. The term "metal halide lamp" as used herein refers to all metal halide lamps known to the skilled artisan, such as automotive headlamps, display lighting and lamps, and fiber optic sources, to name a few. The subject coating freely transmits light in the visible portion of the spectrum, from 400 to 800 nanometers, and reflects and absorbs, light in the UV portion of the spectrum, from 150 –400 nanometers. The coating comprises multiple layers of UV light reflective and absorptive materials, such as the oxides of silicon, tantalum, and titanium.

By "UV radiation" is meant radiation having a wavelength generally below about 380–400 nm. UV radiation having a wavelength of about 260 nm or less is known as "hard" or short wave UV and can produce ozone, as well as degrade materials. UV radiation having a wavelength between about 260–400 nm is detrimental to humans and materials. UV radiation also degrades various dyes, colors and pigments found in fabrics and materials, such as the materials present in displays. Accordingly, a coating according to the invention should block UV radiation having a wavelength between 260–400 nm and, at the same time, be substantially non-absorbent and transparent to visible light radiation.

The term "thermal nonuniformity" is used herein to describe the phenomenon of thermal energy as it traverses the arc tube from interior surface to exterior surface. There is a naturally occurring hot spot present above the arc in all arc tubes. This hot spot is caused by convection within the arc tube. As radiation, or thermal energy, and especially UV radiation, is emitted from the arc, it travels through the arc tube wall. If the arc tube is comprised of the conventional UV-absorbing doped quartz, the UV light is dumped, or absorbed, predominantly along the inner surface of the arc tube as thermal energy. The energy which is not absorbed at the inner surface is absorbed within the thickness of the wall, such that little or no UV energy actually escapes the arc tube. This thermal energy, however, in combination with the naturally occurring convective hot spot, results in enhanced devitrification of the arc tube and early lamp failure.

This problem of thermal nonuniformity is avoided, however, by using undoped quartz for the arc tube. "Undoped quartz" as used herein means silica quartz or weakly doped quartz having a UV attenuation of less than 80%. The subject invention employs undoped quartz having a UV film deposited on the exterior surface of the arc tube. In this design, the UV energy traverses the arc tube and is substantially completely absorbed as thermal energy in the coating, thus "minimizing" the hot spot, or reducing the effect of the hot spot temperature on the lamp to a much greater extent than would be possible using a lamp with a doped quartz envelope. Therefore, compounding of the devitrification problem at the naturally occurring hot spot is avoided.

It is noted herein that the problem of thermal management, or thermal nonuniformity, is not an issue when using thin-walled arc tubes because the UV energy, whether absorbed at the interior surface or exterior surface, has substantially the same effect due to the thin wall.

The subject multi-layer coating, in addition to solving problems of thermal nonuniformity and absorbing UV radiation, is also designed to reflect a certain portion of the UV radiation emitted by the arc tube back into the arc tube. By reflecting UV in the 310–400 nm region, superior UV blocking is achieved relative to a simple UV absorbing coating. Upon reflection back into the arc tube, the reflected UV radiation causes further vaporization of the liquid metal halide dose within the arc tube, thereby enhancing lamp performance.

This invention is particularly well suited for those lamp applications which require the use of pure quartz, or undoped quartz, due to high operating temperatures. Doped quartz has lower viscosity than pure or undoped quartz, due to the dopants, making it undesirable for high temperature applications. Further, those applications, such as automobile uses where it is necessary to achieve high light output quickly, as well as light that is highly focused, benefit from the use of thick-walled arc tubes having no dopants or exterior elements which may interfere with light transmission.

This is clearly seen in FIG. 1 which illustrates the transmittance of UV radiation of a doped quartz arc tube as compared to an arc tube having a multi-layer film according to the subject invention deposited on its exterior surface. In both instances, the doped quartz and the film, the technique was tailored to block 99% of the total UV radiation emitted by the arc. In this FIG. 1, transmittance is presented as a function of position in the quartz wall. It is clearly seen that the transmittance quickly drops off, or that the majority of the thermal energy is absorbed at the inner wall of the doped quartz, while the multi-layer coated quartz shows full transmittance, or no absorbance of thermal energy, until the radiation reaches the coating on the arc tube exterior surface.

Figure 2:
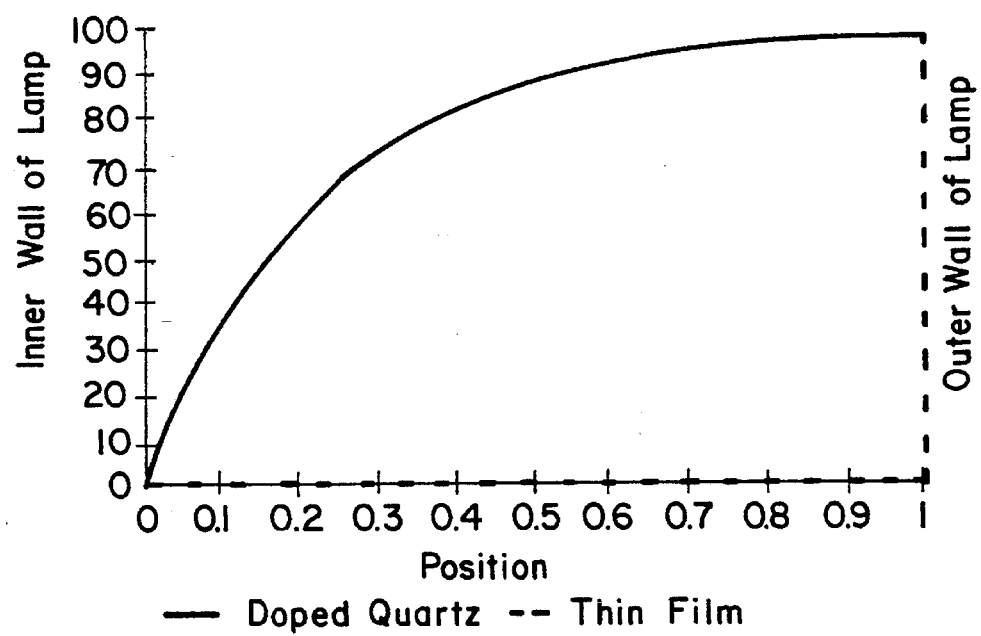
FIG. 2 is a graph showing cumulative UV power absorbed as a function of position in the arc tube wall for a doped quartz arc tube as compared to a pure quartz arc tube bearing the subject thin film coating.

FIG. 2 illustrates the cumulative power absorption for the same materials used to generate the FIG. 1 graph. Again, it is clearly shown in FIG. 2 that the doped quartz quickly absorbs power from the UV radiation as it passes through the arc tube wall, while no power is absorbed in the multi-layer coated arc tube according to the invention until the radiation reaches the exterior of the tube where it is 99% absorbed.

Figure 3A:
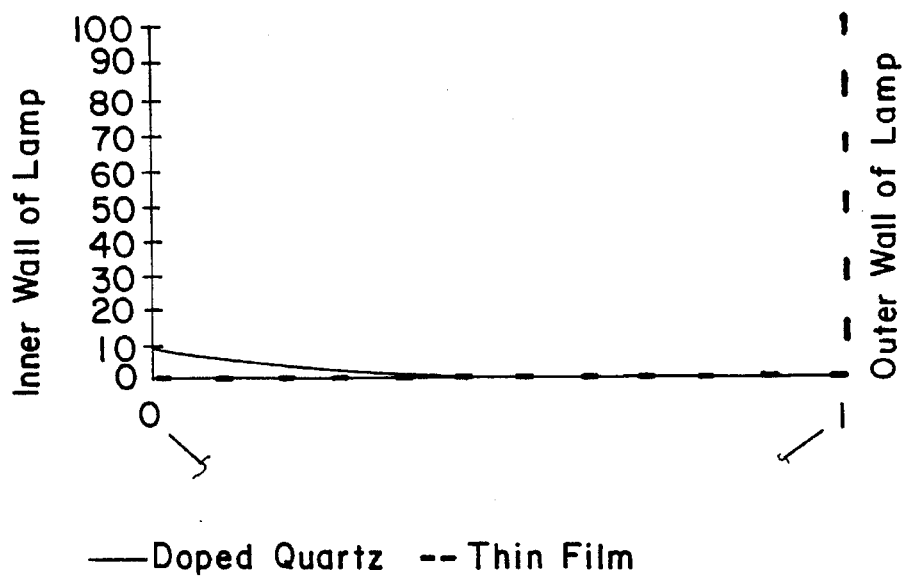
FIG. 3A is a graph showing absorbed UV power as a function of position in the arc tube wall for doped quartz as compared to pure quartz bearing the subject thin film coating.
Figure 3B:
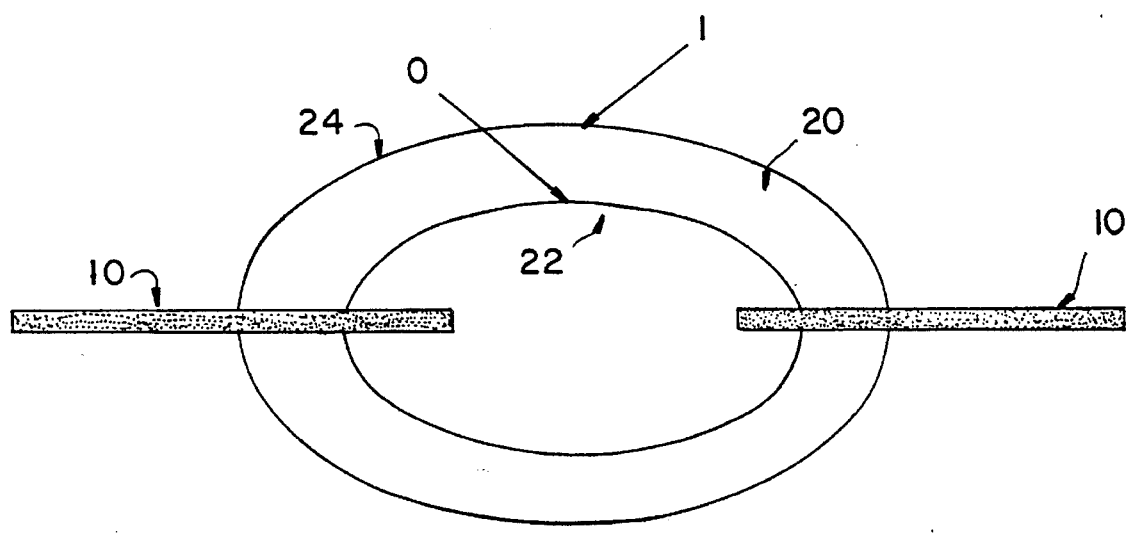
FIG. 3B is a cross-sectional view of a thick-walled arc tube.

FIG. 3A illustrates absorbed UV power for doped quartz as compared to multi-layer coated quartz on a thick-walled arc tube, as shown in FIG. 3B, wherein 10 are electrodes and 20 is the arc tube, 22 being the interior surface thereof and 24 being the exterior surface thereof.

Lamps for which the coating is particularly well suited include metal halide lamps, as defined hereinabove. The subject coating substantially eliminates UV radiation thereby reducing the tendency of display lamps to cause fading of displayed items, such as fabric, plastics, or painted articles. Further, the coating functions to protect the lamp casing and surrounding parts which may be made of a plastic susceptible to UV degradation, and to prevent fiber optic degradation.

The arc tubes for which the subject coating is most useful include small diameter, thick-walled arc tubes having a wall thickness in excess of 1.0 mm, and preferably of at least 1.5 mm. This type of arc tube is commonly used in low wattage metal halide lamp applications, especially those designed for high brightness.

The subject coating, as applied to thick-walled arc tubes, is characterized by a multi-layer arrangement wherein various coating layers comprise materials of differing refractive indices. This combination of low and high refractive index materials causes reflection of UV radiation in the 300–400 nm range. UV radiation in the 150–300 nm range is effectively absorbed by the subject coating. Therefore, the subject coating substantially completely eliminates transmission of UV radiation between 150– 400 nm.

Coatings in keeping with the subject invention will have a thickness of from 0.2 to 4.0μ. Individual layers within the coating may have thicknesses which range from 100 Å–2500 Å. These ranges are a function of the reflective/absorptive characteristics of the individual coating materials and will therefore change with a particular coating configuration.

The subject multi-layer coating may be deposited by any suitable deposition technique known to the skilled artisan for depositing coating materials on arc tube surfaces. Exemplary techniques include, but are not limited to chemical vapor deposition, thermal evaporation, plasma-assisted chemical deposition, ion plating, dip coating, ion beam deposition, and DC magnetron sputtering. Other suitable deposition techniques will be readily apparent to the skilled artisan.

The subject multi-layer coating comprises at least one of the oxides of tantalum, titanium, silicon, niobium, hafnium, cerium, and similarly suitable rare earth metals, and more preferably comprises a combination of at least two of the oxides of silica, tantala and titania. In this preferred combination, the silica component, in combination with tantala or titania, contributes to the reflective quality of the coating. While any of the foregoing materials may be used to gain the desired absorbance/reflectance, the remaining discussion will be particular to the preferred coating materials, which is in no way intended to be limitative given that the skilled artisan will recognize the benefits to be gained by substitution of other known coating materials.

Now then, in one aspect of the preferred coating, tantala and titania layers contribute mainly to the UV absorption characteristic of the coating. In combination, the foregoing materials result coating which effectively transmits visible light radiation in the 400–800 nm portion of the spectrum, and absorbs/reflects UV light radiation in the 150–400 nm portion of the spectrum.

In another aspect of the preferred embodiment hereof, the coating configuration is a coating comprising alternating layers of UV reflecting and absorbing materials. In this instance, the coating comprises alternating layers of tantala and silica. The preferred coating configuration according to the subject invention comprises an 18 layer coating design.

The subject coating design was created using standard multi-layer thin film optics methods well known to the skilled artisan, in combination with the following dispersion curves, measured according to known techniques:

| Dispersion Curve for Tantalum Oxide: | | |
|---|---|---|
| WAVELENGTH (nm) | n | k |
| 200.0 | 3.30000 | 1.20000 |
| 225.0 | 3.20000 | 1.20000 |
| 250.0 | 3.00000 | 0.60000 |
| 260.0 | 2.85000 | 0.35000 |
| 270.0 | 2.70000 | 0.20000 |
| 280.0 | 2.64000 | 0.12000 |
| 290.0 | 2.68000 | 0.01500 |
| 300.0 | 2.58000 | 0.00200 |
| 350.0 | 2.38000 | 0.00150 |
| 360.0 | 2.37666 | 0.00100 |
| 370.0 | 2.35804 | 0.00100 |
| 380.0 | 2.34144 | 0.00050 |
| 390.0 | 2.32655 | 0.00050 |
| 400.0 | 2.31314 | 0.00050 |
| 410.0 | 2.30101 | 0.00050 |
| 420.0 | 2.28999 | 0.00050 |
| 440.0 | 2.27076 | 0.00050 |
| 460.0 | 2.25457 | 0.00050 |
| 480.0 | 2.24080 | 0.00050 |
| 500.0 | 2.22897 | 0.00050 |
| 550.0 | 2.20573 | 0.00050 |
| 600.0 | 2.18880 | 0.00050 |
| 650.0 | 2.17604 | 0.00052 |
| 700.0 | 2.16617 | 0.00044 |
| 800.0 | 2.15210 | 0.00000 |
| 1000.0 | 2.13610 | 0.00000 |
| 1500.0 | 2.12080 | 0.00000 |
| 3000.0 | 2.11190 | 0.00000 |

| Dispersion Curve for Silicon Oxide: | | |
|---|---|---|
| WAVELENGTH (nm) | n | k |
| 198.4 | 1.55400 | 0.00000 |
| 213.9 | 1.53429 | 0.00000 |
| 230.2 | 1.52009 | 0.00000 |
| 248.3 | 1.50841 | 0.00000 |
| 269.9 | 1.49805 | 0.00000 |
| 280.3 | 1.49409 | 0.00000 |
| 302.1 | 1.48719 | 0.00000 |
| 330.3 | 1.48053 | 0.00000 |
| 340.4 | 1.47858 | 0.00000 |
| 350.0 | 1.47721 | 0.00000 |
| 360.0 | 1.47554 | 0.00000 |
| 375.0 | 1.47330 | 0.00000 |
| 400.0 | 1.47014 | 0.00000 |
| 425.0 | 1.46756 | 0.00000 |
| 450.0 | 1.46542 | 0.00000 |
| 475.0 | 1.46362 | 0.00000 |
| 500.0 | 1.46210 | 0.00000 |
| 550.0 | 1.45967 | 0.00000 |
| 600.0 | 1.45784 | 0.00000 |
| 700.0 | 1.45531 | 0.00000 |
| 800.0 | 1.45368 | 0.00000 |
| 1000.0 | 1.45180 | 0.00000 |
| 1500.0 | 1.44890 | 0.00000 |
| 2200.0 | 1.44800 | 0.00000 |
| 2800.0 | 1.42000 | 0.00000 |
| 3500.0 | 1.40570 | 0.00000 |

The specific film design used in this preferred embodiment was as follows:

18 Layer Film Design

[H=tantala; L=silica; thickness' in Angstroms]

1. 176.0H
2. 576.0L
3. 320.0H
4. 530.0L
5. 366.0H
6. 588.0L
7. 356.0H
8. 550.0L
9. 358.0H
10. 538.0L
11. 275.0H
12. 533.0L
13. 217.0H
14. 369.0L
15. 269.0H
16. 402.0L
17. 259.0H
18. 1043.0L

In this film design, the portion of the spectrum where all UV is absorbed is, for the most part, an intrinsic property of the thin film material. However, UV reflectance is a function of the interaction of the alternating layers of the film. It is seen from the curves given that for tantalum oxide the absorption coefficient (k) is very low in the visible (<0.002) and very high below 280 nm (>0.1).

Figure 4:
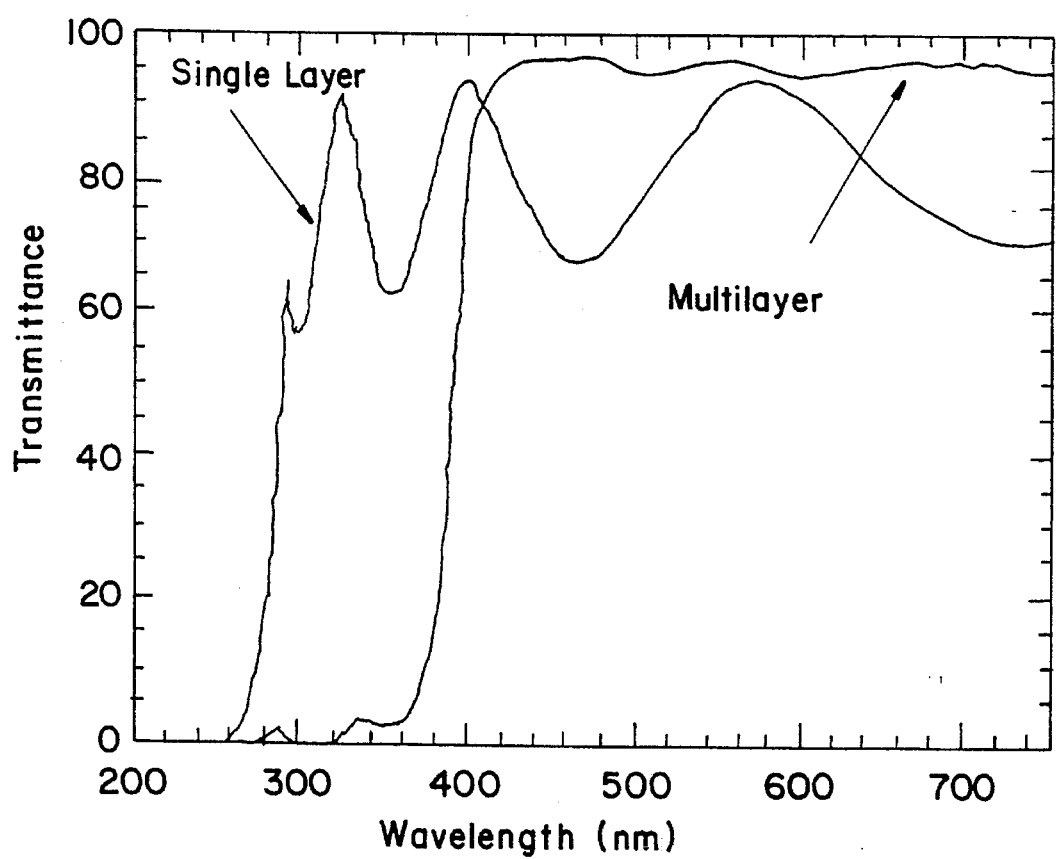
FIG. 4 is a graph showing transmittance curve for the subject multi-layer thin film as compared to a single layer film.

FIG. 4 is a graph showing the transmittance curve for the subject preferred 18 layer film design, as described hereinabove, as well as the curve for transmittance of the same thickness of tantala in a single layer film. That is, both curves have the same total thickness of tantala, but in the multi-layer film design the tantala has been split into nine layers with intervening layers of silica. FIG. 4 clearly shows the superior performance of the subject multi-layer design with respect to blocking UV radiation in the 280–380 nm region as compared to the single layer tantala film. This enhanced UV blocking is the result of the UV radiation in this portion of the spectrum being reflected back into the area of the lamp, which is a function of the alternating material film design, as described hereinabove. UV radiation below 280 nm, shown in FIG. 4 to be blocked by the subject multi-layer film, has actually been absorbed by the tantala. This film has been designed to demonstrate a further performance benefit in that the film is anti-reflective in the visible, suppressing Fresnel reflection. The result of this is that about 2.5% more visible light is emitted on the first bounce relative to that emitted by uncoated quartz.

This multi-layer design could be used with other materials having greater or lesser absorption, per the desires of the skilled artisan. For instance, titania has stronger absorption in the 300 nm region. Titania, however, is generally not sufficiently stable at temperatures in excess of 800° C. for use on metal halide lamps. One possible way to avoid this problem may be to mix several oxides to take advantage of the superior qualities of each particular oxide. The skilled artisan, given the foregoing examples and teaching will be able to combine various oxides to achieve the maximum desired performance for a given purpose while yet avoiding the various shortcomings of oxides which may be used.

The preferred coating deposition technique is a CVD technique and can be accomplished in accord with the description thereof set forth in U.S. Pat. No. 4,949,005 to our common assignee.

The skilled artisan will recognize from the foregoing the benefits of the coating composition which is the subject hereof. Particularly, the coating of the subject invention increases the percent absorbance of UV radiation. It further affects the thermal characteristics of the lamp resulting in shorter warm-up time in discharge headlamps and increased lumens as a result of the UV radiation reflected back into the arc tube and subsequently absorbed. Finally, the subject multi-layer coating effectively absorbs/reflects thermal energy emitted as UV by the arc at the exterior arc tube surface thereby eliminating problems due to the compounding of the effects of the convection hot spot, and enhancing the life of the lamp.

While particular embodiments of the invention have been shown and described, it will be obvious to those skilled in the art that various changes and modifications may be made without departure from the invention in its broader aspects; and it is, therefore, intended herein to cover all such changes and modifications as fall within the true spirit and scope of the invention.

Figure 5A:
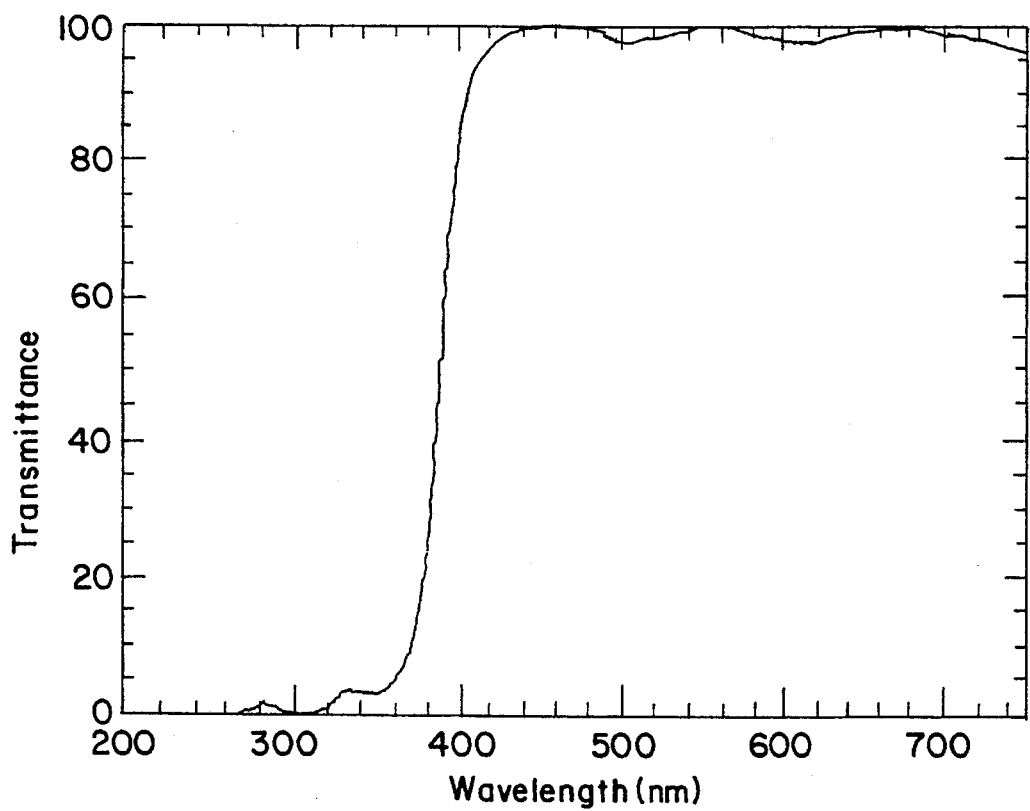
FIGS. 5A–5C are graphs representing the transmittance, reflectance and absorption, respectively, of the preferred 18 layer thin film design.
Figure 5B:
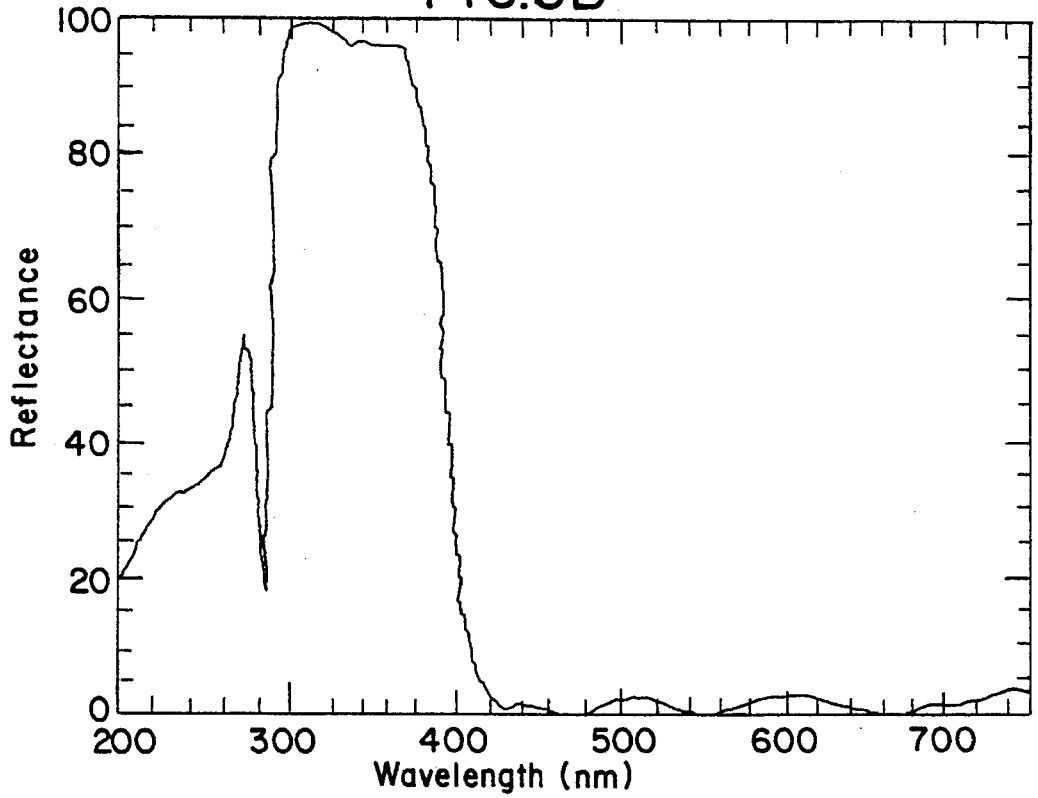
Figure 5C:
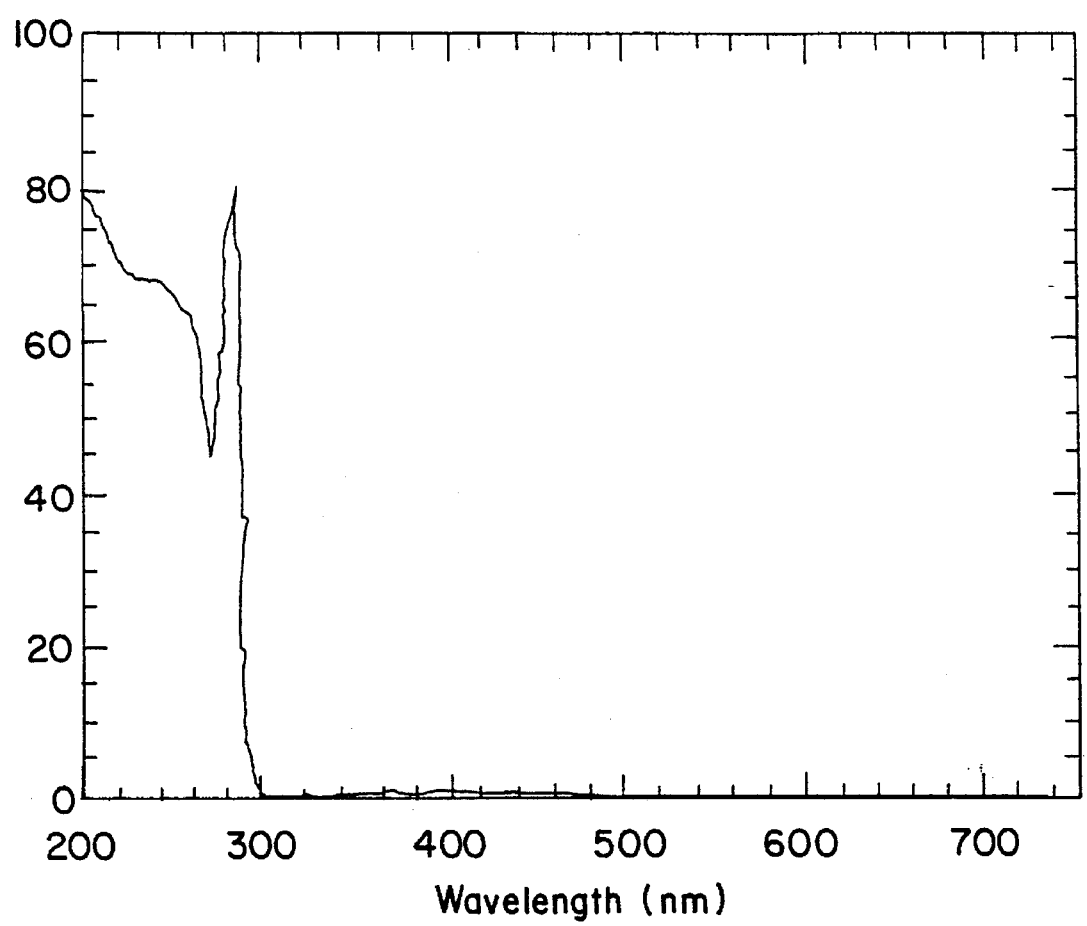
Figure 6A:
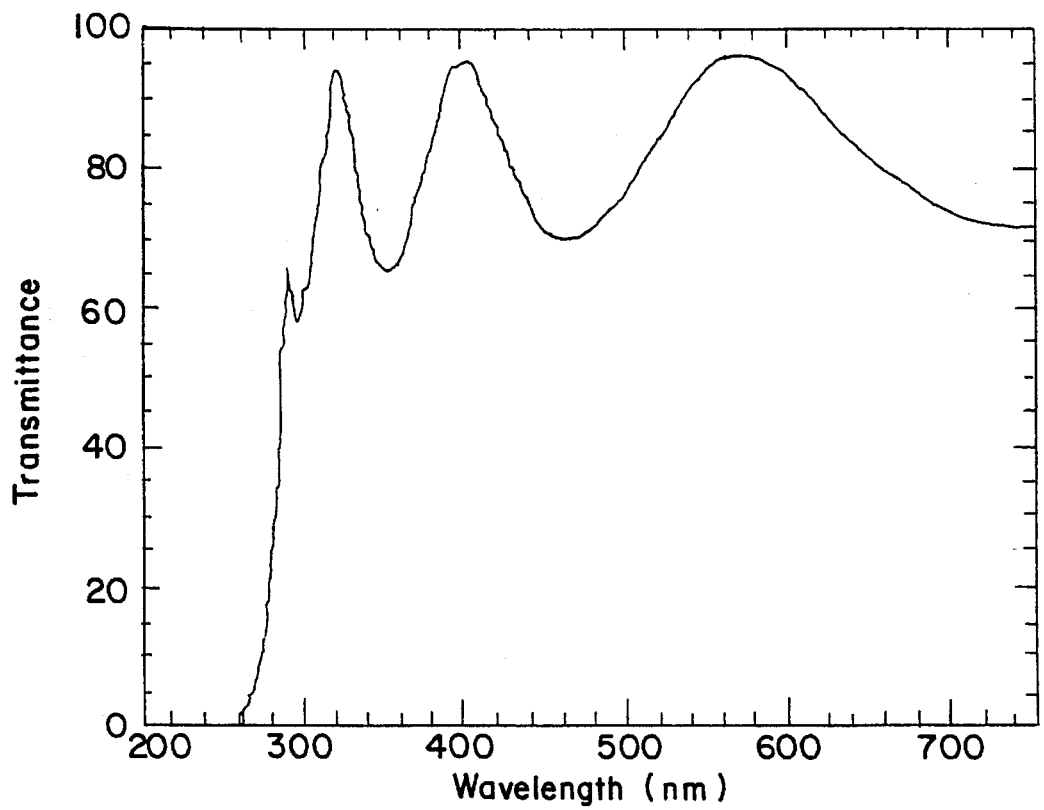
FIGS. 6A–6C are comparative graphs representing the transmittance, reflectance and absorption, respectively, for a single layer film design.
Figure 6B:
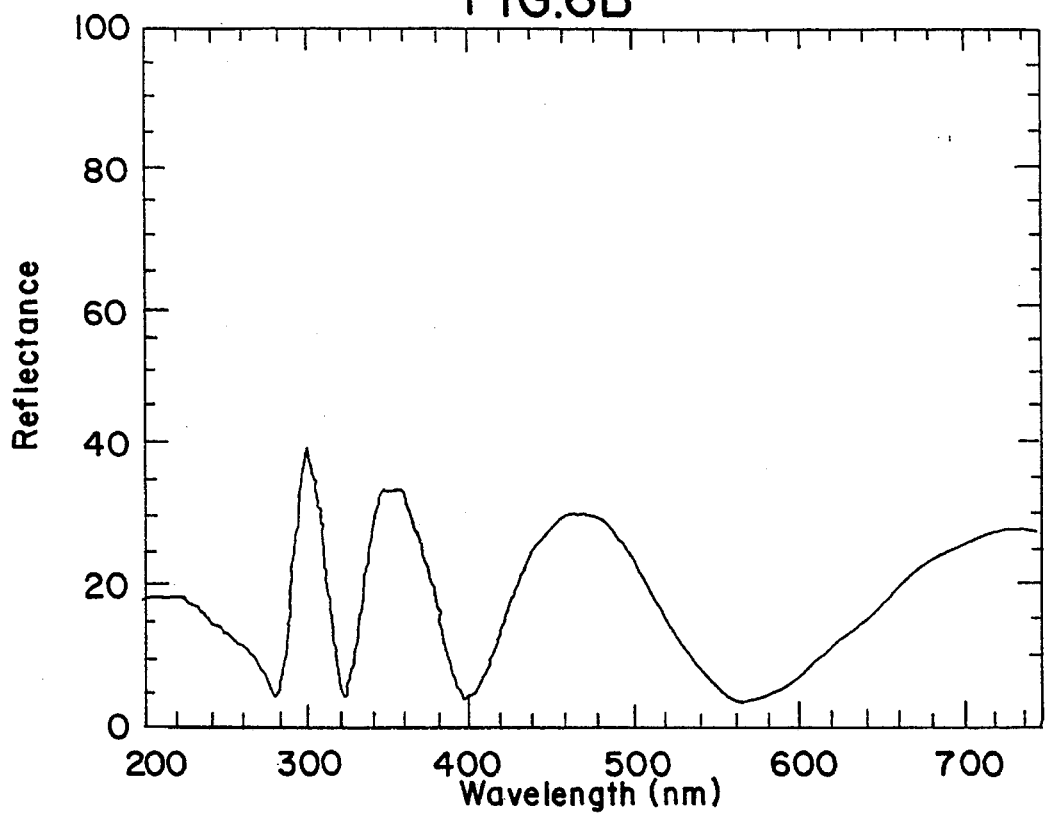
Figure 6C:
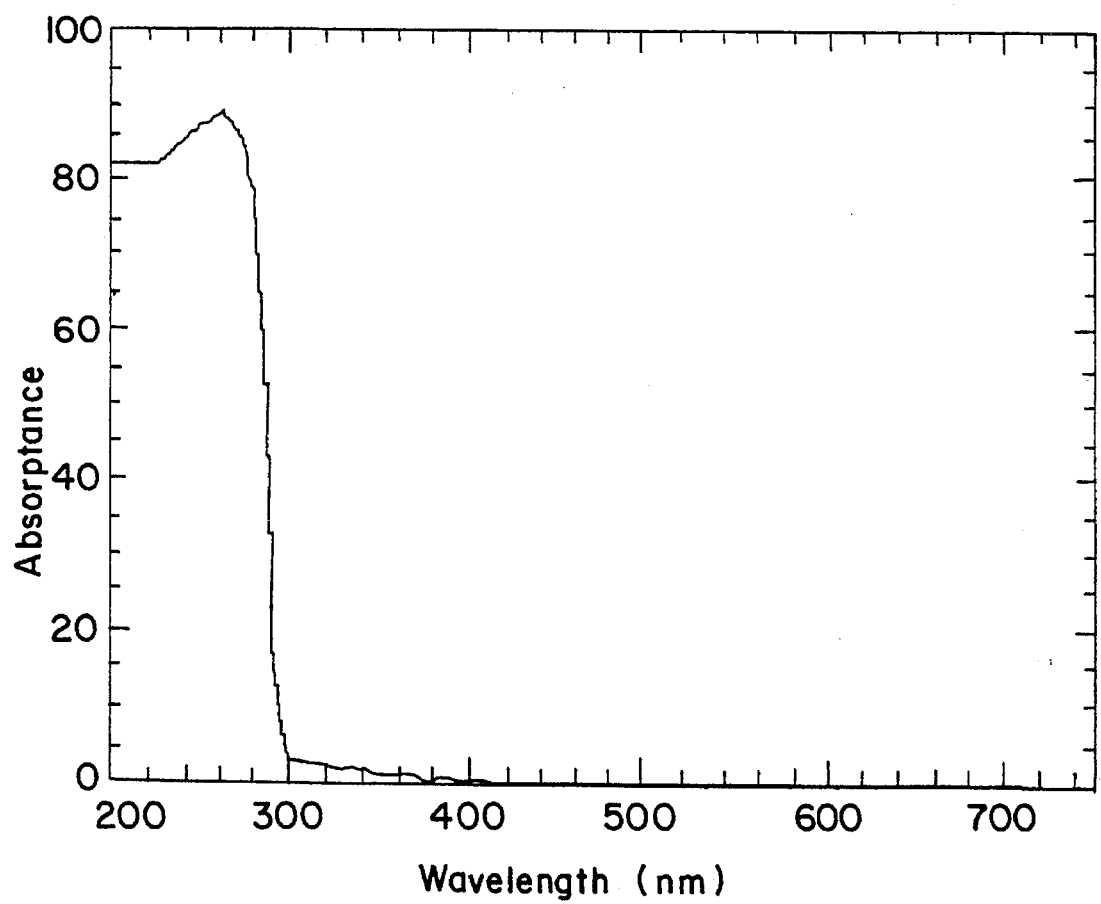

FIGS. 5A–5C show the transmittance, reflectance and absorption, respectively, of the 18 layer thin film design which is the preferred embodiment hereof. These curves, as compared to the transmittance, reflectance, and absorption curves, respectively, for a single layer tantala film, as shown in FIGS. 6A–6C, show a marked improvement in blocking performance of the subject film design. Specifically, the transmittance curves 5A and 6A show substantial transmittance starting at 280 nm in the single layer film (FIG. 6A) while the multi-layer film does not transmit radiation until 380–400 nm (FIG. 5A). FIGS. 5B and 6B compare the reflectance for the multi-layer film design (5B) versus the single layer film design (6B), and quite clearly show excellent reflectance in the multi-layer film between 280–380 nm and insignificant reflectance in this region for the single layer film. Both film designs show good absorption characteristics below 280 nm (FIGS. 5C and 6C) as would be expected given the absorption performance of tantala. Overall, these FIGS. 5A–5C and 6A–6C show clearly the capability of the multi-layer film design to reflect UV radiation in the 280–380 nm range, thus enhancing the overall blocking or elimination of UV transmission, as compared to a single layer film design which lacks the reflectance capabilities.

What is claimed is:

1. A method for managing the thermal nonuniformity across the wall of a thick-walled arc tube in a metal halide lamp comprising:
    a. providing an arc tube having a wall thickness in excess of 1 mm;
    b. disposing a multi-layer coating on the exterior surface of said arc tube, said coating having a thickness of not greater than about 2.0 microns and comprising at least two different materials having different refractive indexes which, in combination, absorb deep UV radiation below 300 nm and reflect near UV radiation between 300–400 nm;
    c. operating said lamp to cause UV emission; and
    d. absorbing the radiant energy emitted from the arc as deep UV radiation below 300 nm uniformly along the exterior of said arc tube in said multi-layer coating and reflecting at least 90% of the radiant energy emitted from the arc as near UV radiation between 300–400 nm back into said lamp.

2. The method of claim 1 wherein said near UV radiation is reflected back into the arc tube enhancing the vapor pressure of the metal halide dose of said metal halide lamp.

3. The method of claim 1 wherein said arc tube comprises undoped quartz.

4. The method of claim 1 wherein said multi-layer coating comprises at least two oxides of materials selected from the group consisting of silicon, tantalum, titanium, cerium, niobium, hafnium and the rare earth elements.

5. The method of claim 4 wherein said multi-layer coating comprises the oxides of tantalum and silicon.

6. The method of claim 1 wherein said coating comprises the oxides of tantalum and silicon deposited in alternating layers.

7. The method of claim 6 wherein said multi-layer coating has 18 layers.

8. The method of claim 1 wherein said multi-layer coating comprises tantala, silica and titania.

9. A metal halide lamp which transmits visible light radiation and absorbs and reflects UV radiation comprising a thick-walled arc tube containing a metal halide dose, and having disposed on the surface of said arc tube a multi-layer coating which absorbs UV radiation below 300 nm and reflects at least 90% of UV radiation of between 300 nm and 400 nm.

10. The metal halide lamp of claim 9 wherein said coating is disposed on the exterior surface of said lamp.

11. The metal halide lamp of claim 10 wherein said thick-walled arc tube is in excess of about 1.0 mm thick.

12. The metal halide lamp of claim 10 wherein said thick-walled arc tube is at least about 1.5 mm thick.

13. The metal halide lamp of claim 10 wherein said multi-layer coating comprises alternating layers of at least two materials having different indexes of refraction.

14. The metal halide lamp of claim 13 wherein said multi-layer coating comprises alternating layers of at least two oxides of materials selected from the group consisting of silicon, tantalum, titanium, cerium, niobium, hafnium and the rare earth elements.

15. The metal halide lamp of claim 14 wherein said multi-layer coating comprises the oxides of silicon, tantalum and titanium.

16. The metal halide lamp of claim 14 wherein said multi-layer coating comprises alternating layers of the oxides of silicon and tantalum.

17. The metal halide lamp of claim 14 wherein said multi-layer coating has an 18 layer design.

18. The metal halide lamp of claim 10 wherein said coating enhances visible light emission by suppressing Fresnel reflection at the exterior lamp surface.

19. A coating for use in metal halide lamps comprising multiple layers of oxides of at least two materials having different indexes of refraction such that UV emission below 300 nm is absorbed, at least 90% of UV emission between 300–400 nm is reflected, and visible light is transmitted, said coating having a thickness not greater than about 2.0 microns.

20. The coating of claim 19 wherein said coating is deposited on the exterior surface of said arc tube.

21. The coating of claim 19 wherein said coating comprises at least two materials selected from the group consisting of the oxides of silicon, tantalum, titania, cerium, hafnium, niobium and the rare earths.

22. The coating of claim 19 wherein said coating comprises the oxides of silicon, tantalum and titanium.

23. The coating of claim 19 wherein said coating comprises the oxides of silicon and tantalum.

24. The coating of claim 19 wherein said coating comprises alternating layers of silica and tantala.

25. The coating of claim 24 wherein said coating has an 18 layer design.

26. The coating of claim 19 wherein said coating absorbs thermal energy emitted from said arc tube substantially uniformly along the exterior surface of said arc tube to maximize lamp life and minimize hot spot devitrification.

27. The coating of claim 19 wherein said coating enhances visible light emission by suppressing Fresnel reflection at the exterior lamp surface.

28. A method for controlling the thermal loading across the wall of a thick-walled arc tube comprising:

a. providing a metal halide lamp with an arc tube having a wall thickness of greater than about 1.5 mm; and b. applying a coating having a thickness of not greater than about 2.0 microns to the exterior surface of said thick-walled arc tube, said coating substantially completely blocking transmission of radiation in the 150–400 nm range by absorbing deep UV radiation below 300 nm and reflecting at least 90% of near UV radiation between 300–400 nm substantially uniformly along the exterior surface of said arc tube such that the temperature in a lamp hot spot is minimized.

* * * * *